United States Patent
Liu et al.

(10) Patent No.: US 8,053,994 B2
(45) Date of Patent: Nov. 8, 2011

(54) INTELLIGENT WALL SWITCH

(76) Inventors: Yuan-Sheng Liu, Taiping (TW);
Yen-Wen Chen, Tainan (TW)

( * ) Notice: Subject to any disclaimer, the term of this patent is extended or adjusted under 35 U.S.C. 154(b) by 385 days.

(21) Appl. No.: 12/477,248

(22) Filed: Jun. 3, 2009

(65) Prior Publication Data
US 2010/0308735 A1    Dec. 9, 2010

(51) Int. Cl.
*H05B 37/02*    (2006.01)
(52) U.S. Cl. ........ 315/159; 315/155; 315/149; 307/119; 307/125; 307/126; 307/128; 307/140
(58) Field of Classification Search ............... 315/149, 315/155, 159; 307/119, 125, 126, 128, 139, 307/140; 345/173, 174
See application file for complete search history.

(56) References Cited

U.S. PATENT DOCUMENTS

| | | | |
|---|---|---|---|
| 5,586,048 A * | 12/1996 | Coveley | 702/189 |
| 5,986,358 A * | 11/1999 | Hsieh | 307/117 |
| 7,321,120 B1 * | 1/2008 | Gorman et al. | 250/338.1 |

* cited by examiner

*Primary Examiner* — Douglas W Owens
*Assistant Examiner* — Jonathan Cooper
(74) *Attorney, Agent, or Firm* — Alan Kamrath; Kamrath & Associates PA (57) ABSTRACT

An intelligent wall switch comprises an extend operation panel including sensor areas with a first conducting film; a glass on the back sides of the sensor areas including second conducting films; a first circuit board including a backlight LED and an infrared emitter and connected to a flexible cable connected to the second conducting film; a frame on a back side of the glass; a controller system including a second circuit board having an AC-DC power module, relays, AC output connectors, an AC input connector all on a back side thereof, and having a flat cable connector, an infrared receiver, and multiple indicating LEDs all on a front side thereof; a connecting piece and a housing being used to receive the AC-DC power module, the connecting piece being disposed on a back side of the frame, the AC-DC power module being connected to the cable by the flat cable connector.

10 Claims, 11 Drawing Sheets

INTELLIGENT WALL SWITCH

BACKGROUND OF THE INVENTION

1. Field of the Invention

The present invention relates to an intelligent wall switch that can be precisely activated by a gentle finger touch and allows to collaborate with various types of infrared remote controllers.

2. Description of the Prior Art

The majority of conventional wall switches work by including an extended operation panel with a conducting film, an infrared receiver, and a controller panel, etc., so as to be powered on/off by finger touch on the panel; however those have the following disadvantages:

Due to the area of the extended operation panel is not large enough for the elder to easily touch the panel precisely, and the conventional wall switch can only match with a selected infrared remote controller, so will these disadvantages limit the application of the wall switches in as many households as expected to be. Furthermore, the indicating LEDs are not bright enough for users to clearly distinguish the working status of the wall switches.

The present invention has arisen to mitigate and/or obviate the afore-described disadvantages.

SUMMARY OF THE INVENTION

The primary objective of the present invention is to provide an intelligent wall switch that can provide larger sensor areas to touch the wall switch easily.

A further objective of the present invention is to provide an intelligent wall switch that can emit lights to be distinguished its location clearly.

Another objective of the present invention is to provide an intelligent wall switch that can memorize various types of infrared codes to cooperate with a variety of infrared remote controllers.

An intelligent wall switch according to the present invention comprises:

an extended operation panel including at least one sensor area, the sensor area including a first conducting film disposed on the back side thereof;

a glass disposed on the back side of the sensor area of the extended operation panel and including at least one second conducting film plated onto the back side thereof;

a first circuit board including a backlight LED and an infrared emitter and being connected to a flexible cable, and the flexible cable being connected to the second conducting film of the glass;

a plastic frame disposed on the back side of the glass;

a controller system including a second circuit board having an AC-DC power module, a plurality of relays and AC output connectors, and an AC input connector which is all mounted on the back side of the second circuit board, the second circuit board further has a micro controller, a flat cable connector, an infrared receiver, a buzzer, and a number of indicating LEDs which are all fixed on the front side thereof;

a connecting piece and a housing being used to place the AC-DC power module, the connecting piece being disposed on the back side of the frame, and the AC-DC power module being connected to the flexible cable by using the flat cable connector.

The present invention will become more comprehensible from the following description when taken in connection with the accompanying drawings, which show, for the purpose of illustrations only, the preferred embodiments in accordance with the present invention.

DETAILED DESCRIPTION OF THE PREFERRED EMBODIMENTS

Figure 1:
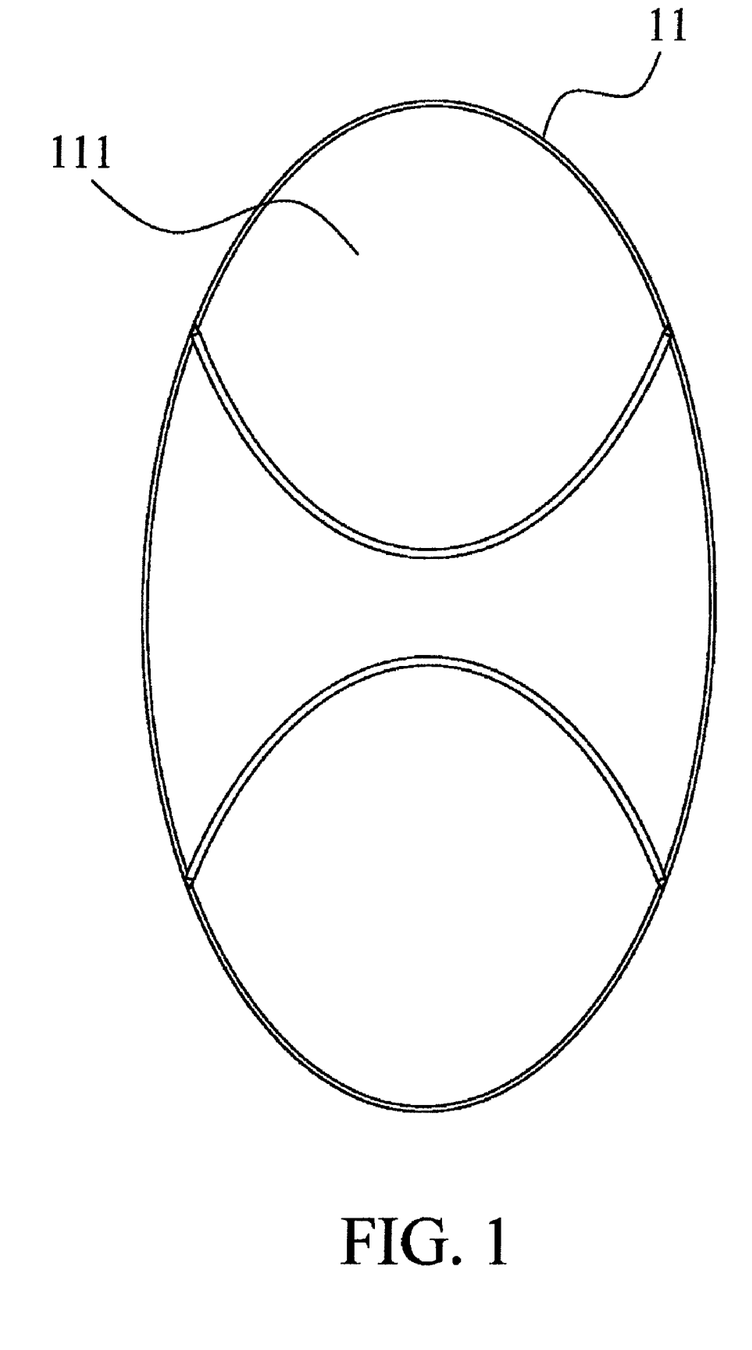
FIG. 1 is a perspective view of an intelligent wall switch in accordance with the present invention.
Figure 2A:
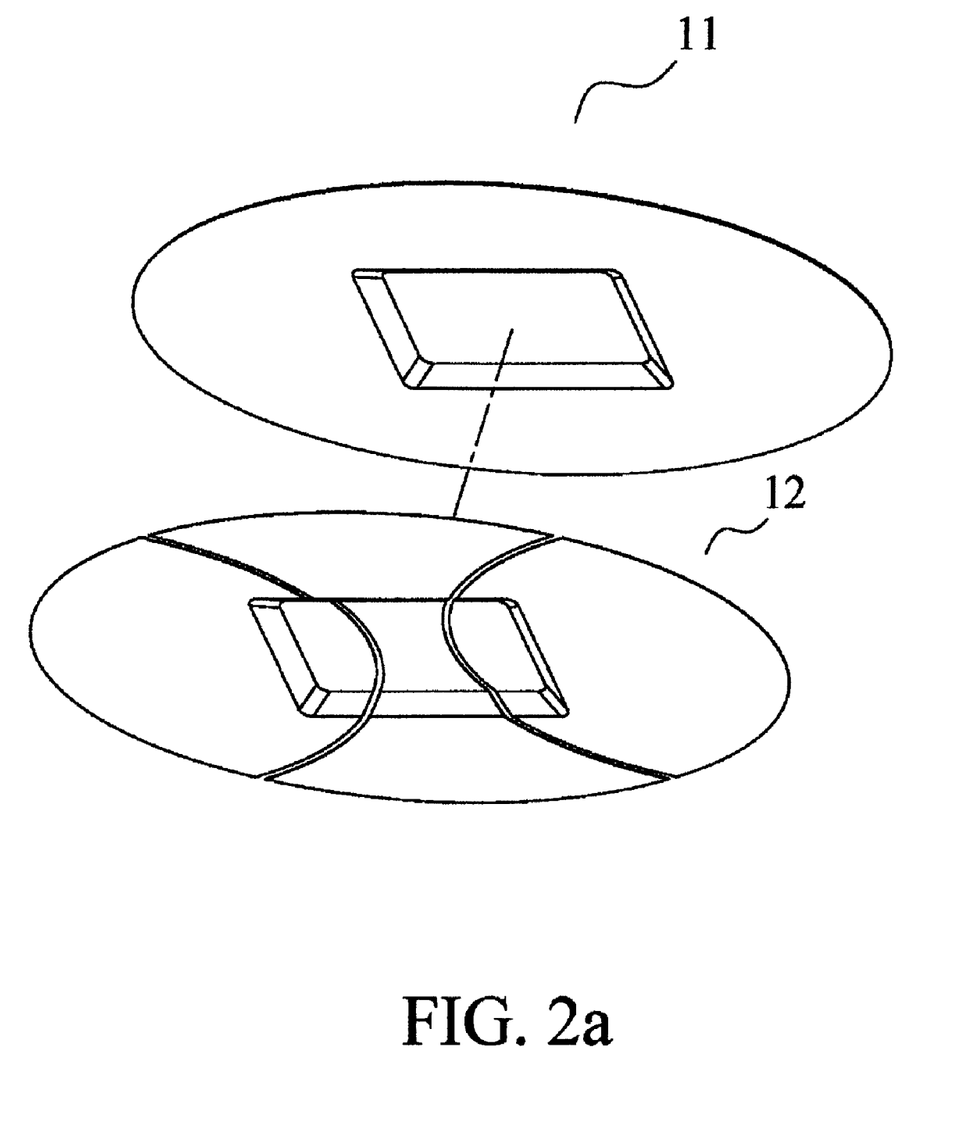
FIG. 2a is a perspective view showing the exploded components of the intelligent wall switch in accordance with the present invention.
Figure 2B:
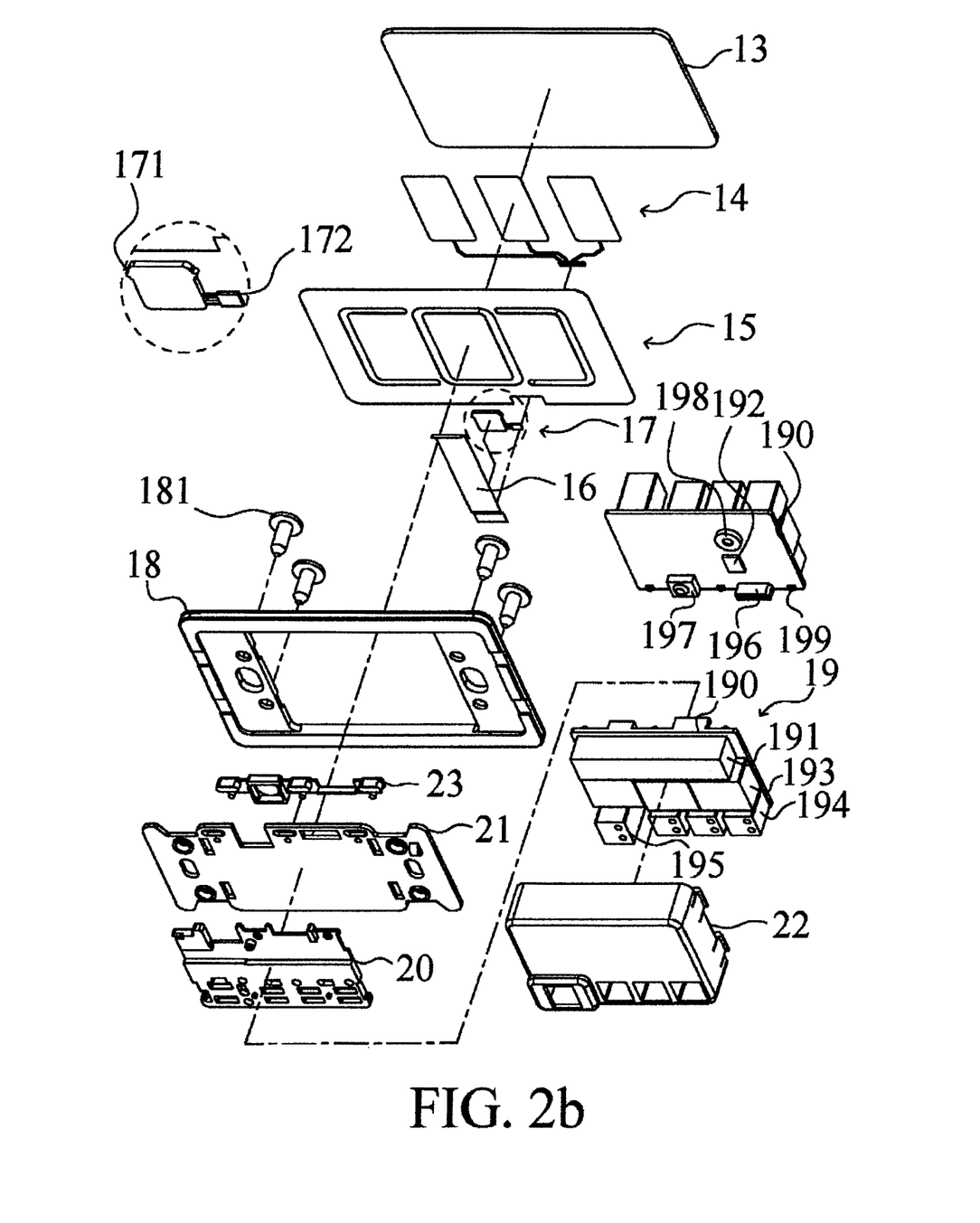
FIG. 2b is another perspective view showing the exploded components of the intelligent wall switch in accordance with the present invention.
Figure 3A:
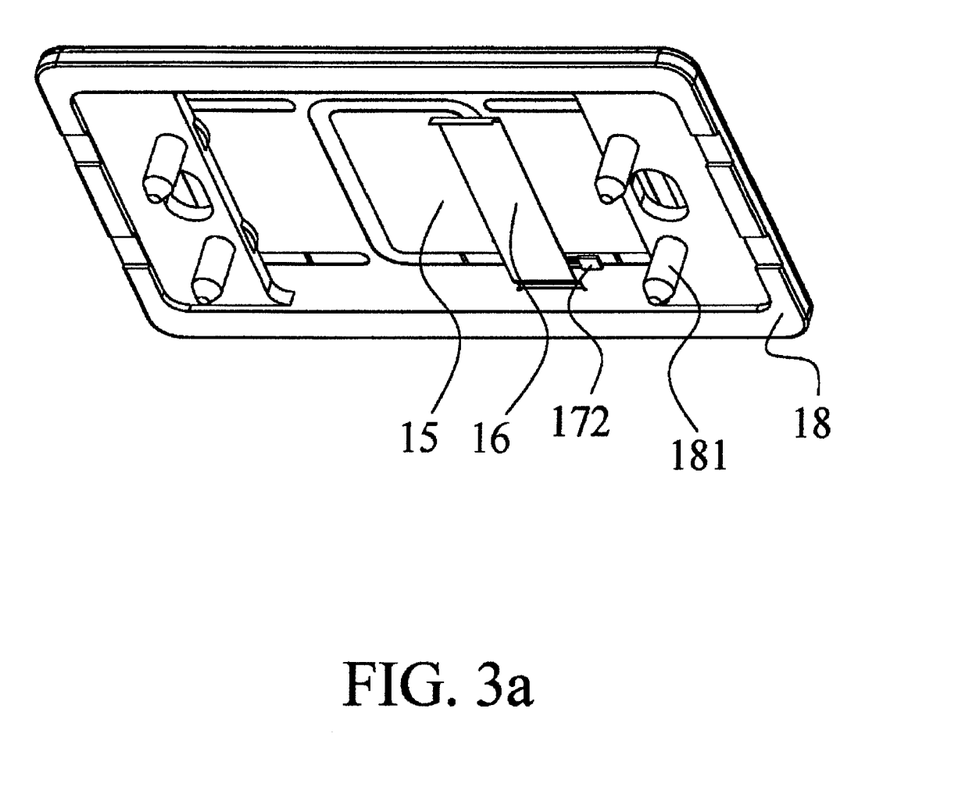
FIG. 3a is a perspective view showing the part of the assembly of the intelligent wall switch in accordance with the present invention.
Figure 3B:
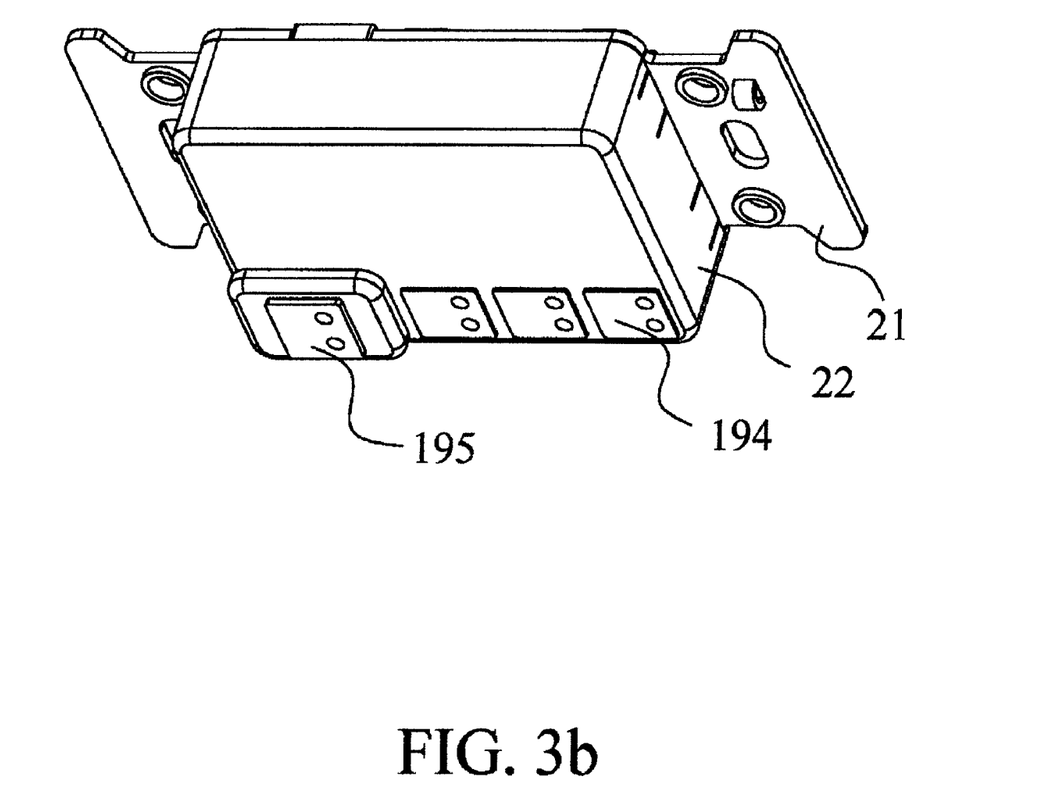
FIG. 3b is another perspective view showing the part of the assembly of the intelligent wall switch in accordance with the present invention.
Figure 4:
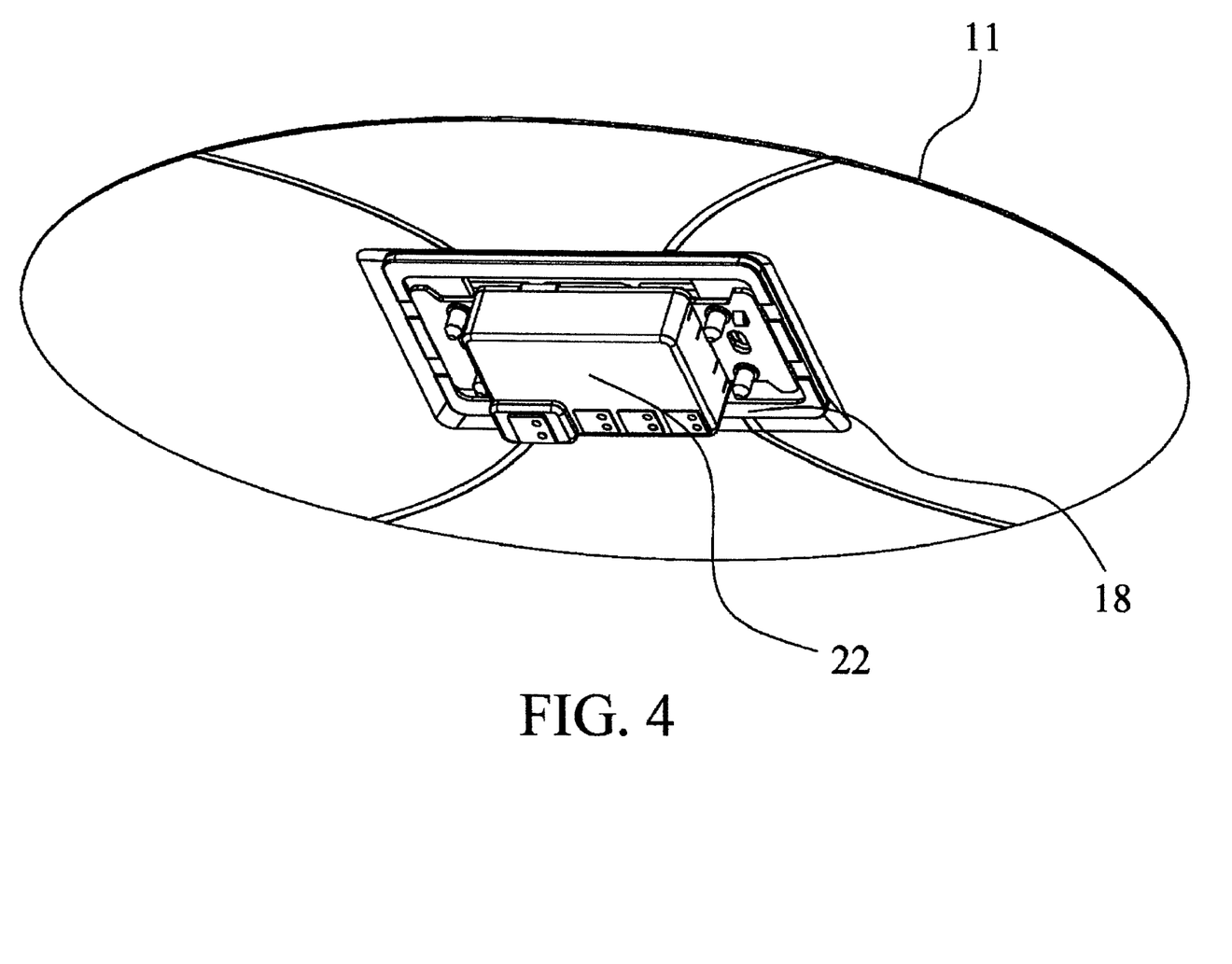
FIG. 4 is a back plan view showing the assembly of the intelligent wall switch in accordance with the present invention.
Figure 5:
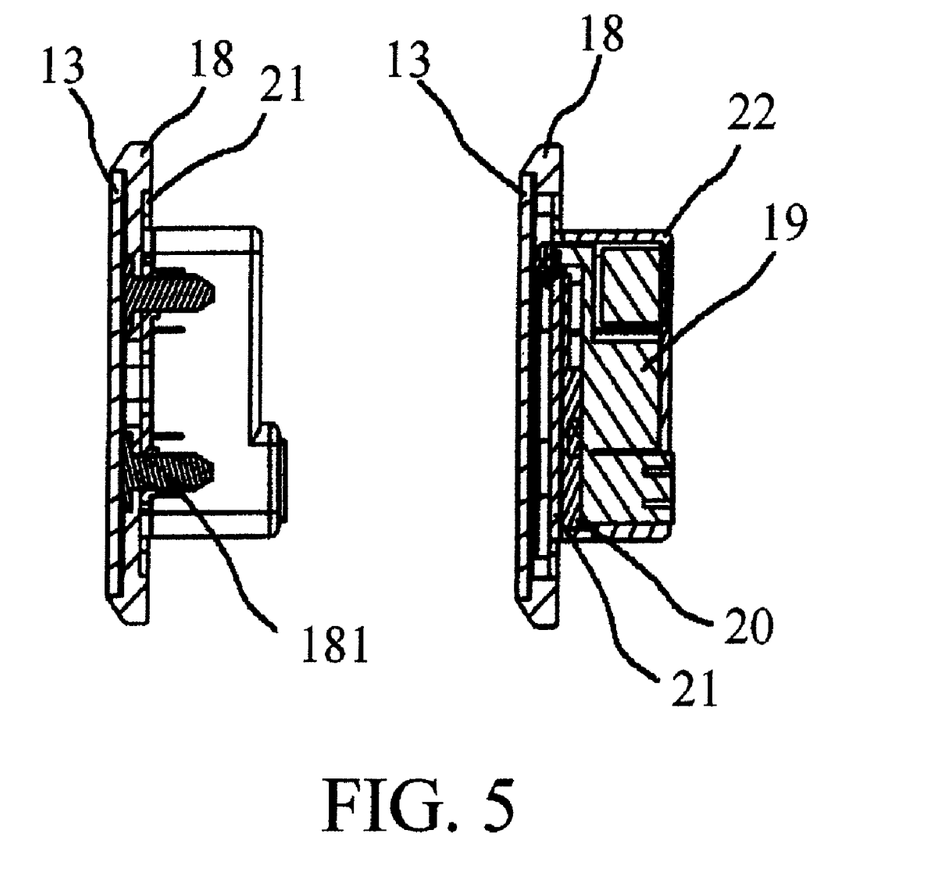
FIG. 5 is a cross sectional view showing the assembly of the intelligent wall switch in accordance with the present invention.
Figure 6:
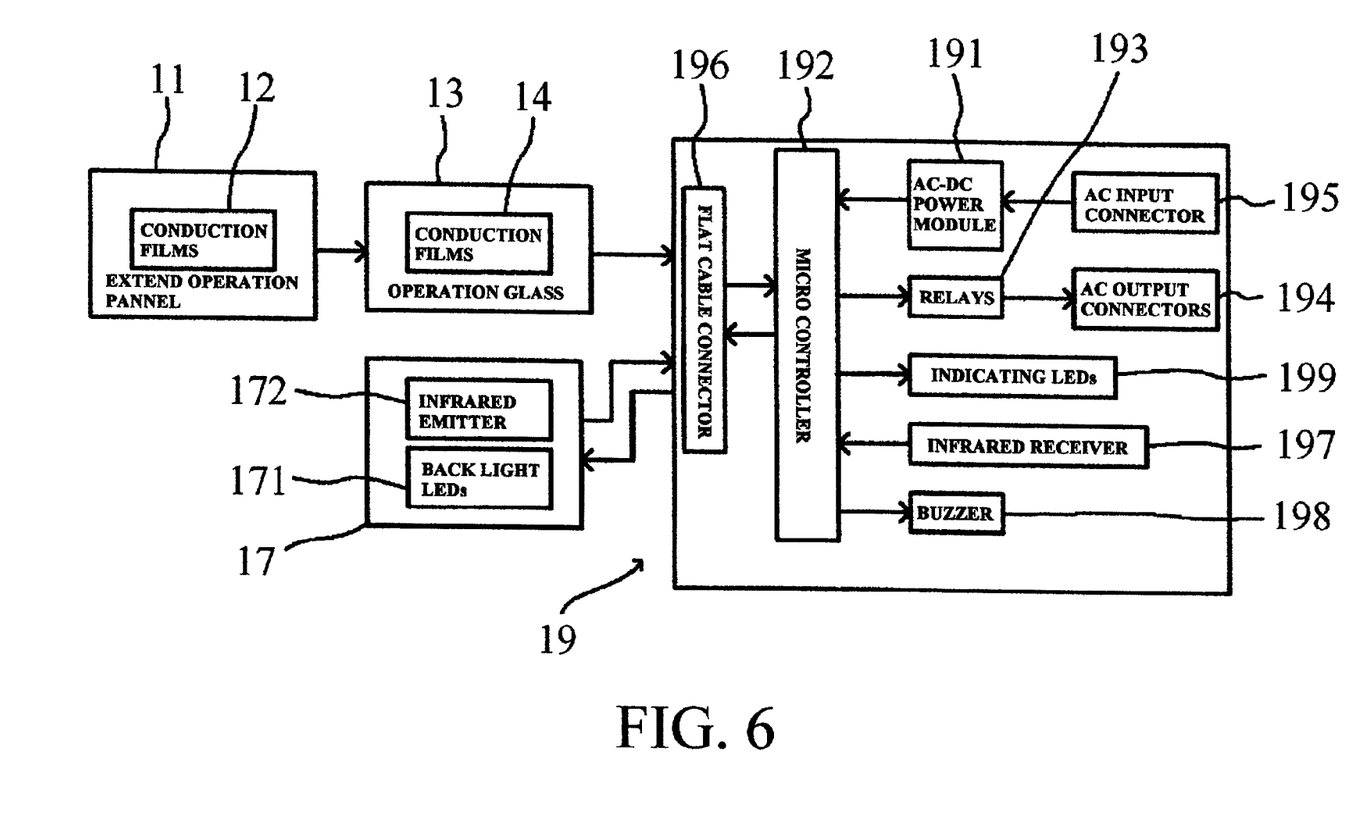
FIG. 6 is a block diagram showing the intelligent wall switch in accordance with the present invention.

Referring to FIGS. 1-6, an intelligent wall switch in accordance with the present invention comprises an extended operation panel 11 made of transparent plastic materials and including a plurality of sensor areas 111, each sensor area 111 including a first conducting film 12 and a glass 13 disposed on the back side thereof respectively, a plurality of second conducting films 14 being made of transparent indium oxide materials and plated onto the back side of the glass 13 for corresponding to the sensor areas 111 of the extended operation panel 11, the glass 13 serving as a substrate and further including a name plate 15 attached on the back side thereof, and the extended operation panel 11, the glass 13, and the name plate 15 being combined together. The second conducting films 14 are connected to a flexible cable 16 on which a first circuit board 17 is welded and includes at least one backlight LED 171 and an infrared emitter 172, a plastic frame 18 is disposed on a back side of the name plate 15 and includes a number of bolts 181 secured thereon, wherein the infrared emitter 172 controls the backlight LED 171 to power on/off as detecting object is close to or leaves away. A controller system 19 includes a second circuit board 190 having an AC-DC power module 191, a plurality of relays 193 and AC output connectors 194, and an AC input connector 195 which are all mounted on a back side of the second circuit board 190, the second circuit board 190 further has a micro controller 192, a flat cable connector 196, an infrared receiver 197, a buzzer 198, and a number of indicating LEDs 199 which are all fixed on a front side thereof. The second circuit board 190 further includes an engaging member 20 located on the front side thereof, a connecting piece 21 and a housing 22 are used to receive the second circuit board 190, the connecting piece 21 is disposed on a back side of the frame 18, and the second circuit board 190 is connected to the flexible cable 16 by using the flat cable connector 196.

In assembly, the flexible cable connector 16, the infrared receiver 197, the buzzer 198, and the indicating LEDs 199 are inserted to project out of the front side of the connecting piece 21, and a light guiding member 23 is arranged at a predetermined position on the front side of the connecting piece 21 in response to the indicating LEDs 199. Thereafter, one end of the flexible cable 16 is connected to the flat cable connector 196, and the connecting piece 21 is assembled to the back side of the frame 18, thereby finishing the assembly.

Figure 7:
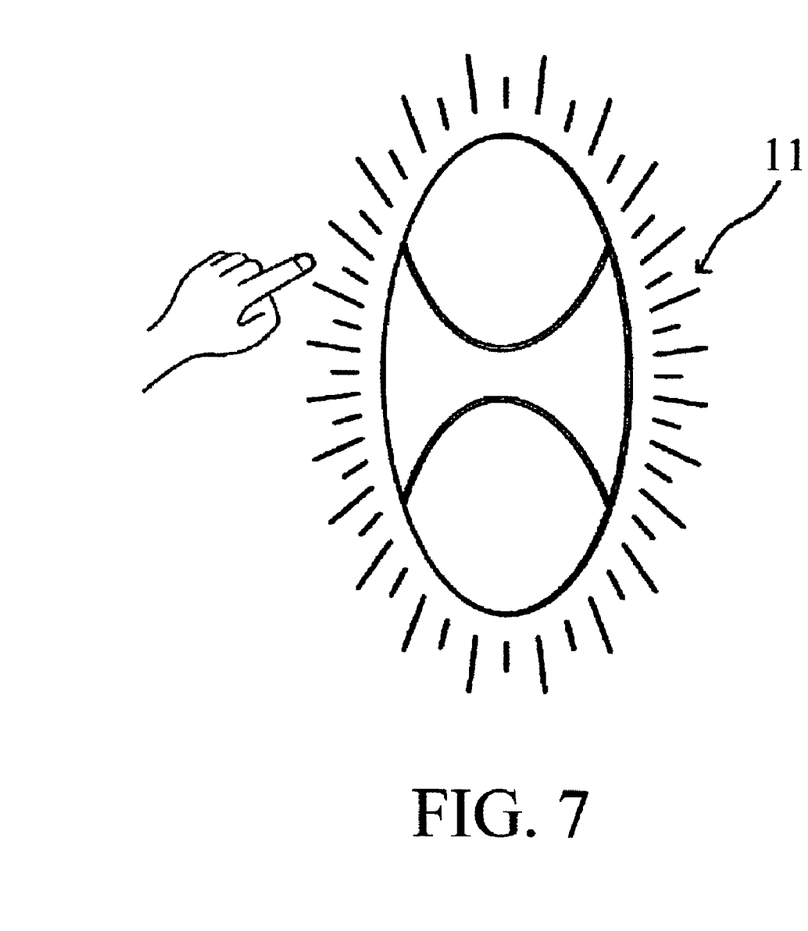
FIG. 7 is a plan view showing the operation of the intelligent wall switch in accordance with the present invention.
Figure 8:
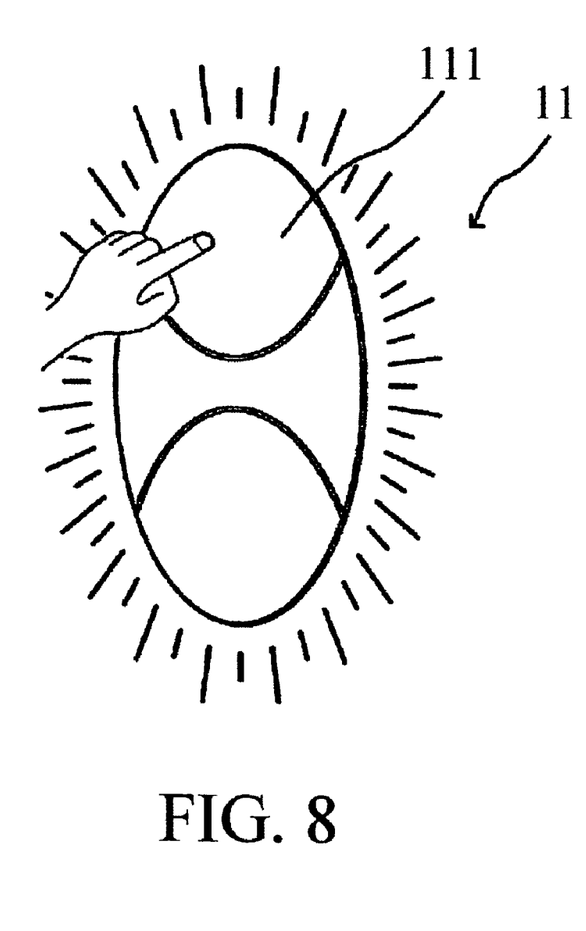
FIG. 8 is another plan view showing the operation of the intelligent wall switch in accordance with the present invention.
Figure 9:
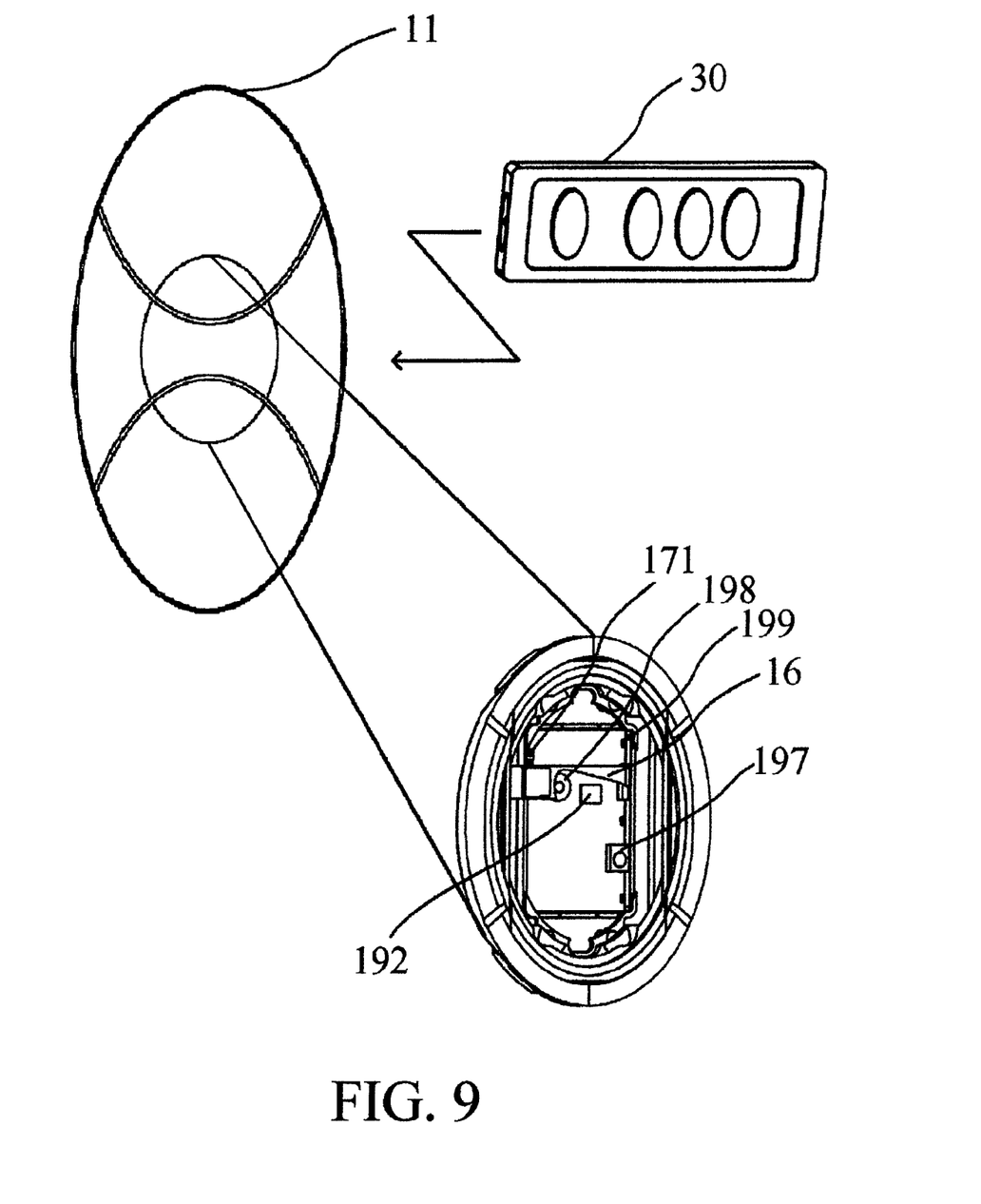
FIG. 9 is perspective view showing the intelligent wall switch being in cooperation with an infrared remote controller in accordance with the present invention.

As shown in FIGS. 2a, 2b, and 6-9, as user is close to the wall switch at a certain distance, say 10~20 cm, infrared rays remitting from the infrared emitter 172 are reflected by the user, and the infrared receiver 197 of the controller system 19 will receive and then transmit infrared signals to the micro controller 192 to be determined. Thereafter, the backlight LED 171 of the first circuit board 17 emits light to provide a preferred brightness to the extended operation panel 11, observing the wall switch clearly. On the contrary, as the user leaves from the wall switch, the infrared receiver 197 will not receive the infrared signals from the infrared emitter 172, therefore the micro controller 192 controls the backlight LED 171 to power off.

Referring further to FIGS. 2, 5, 6, and 8, as the user touches the sensor area 111, a capacitor value between the first and second conducting films 12, 14 is changed and transmitted to the micro controller 192 to be determined, and then the relay 193 is driven to provide or shut off AC power source being output to the AC output connector 194, the micro controller 192 controls the indicating LEDs 199 to emit the brightest light and controls the buzzer 198 to make sounds at a fixed frequency within a certain period of time. After the finger untouches the extended operation panel 11, the capacitor value between the first and second conducting films 12, 14 recovers to its initial default. When the micro controller 192 receives the recovered signals, while the relay 193 status is to provide the AC power source to the AC output connector 194, the micro controller 192 determining the indicating LEDs 199 to turn off, yet if the relay 193 shut off the AC power source being outputted to the AC output connector 194, the micro controller 192 determining the indicating LEDs 199 to emit light.

Figure 10:
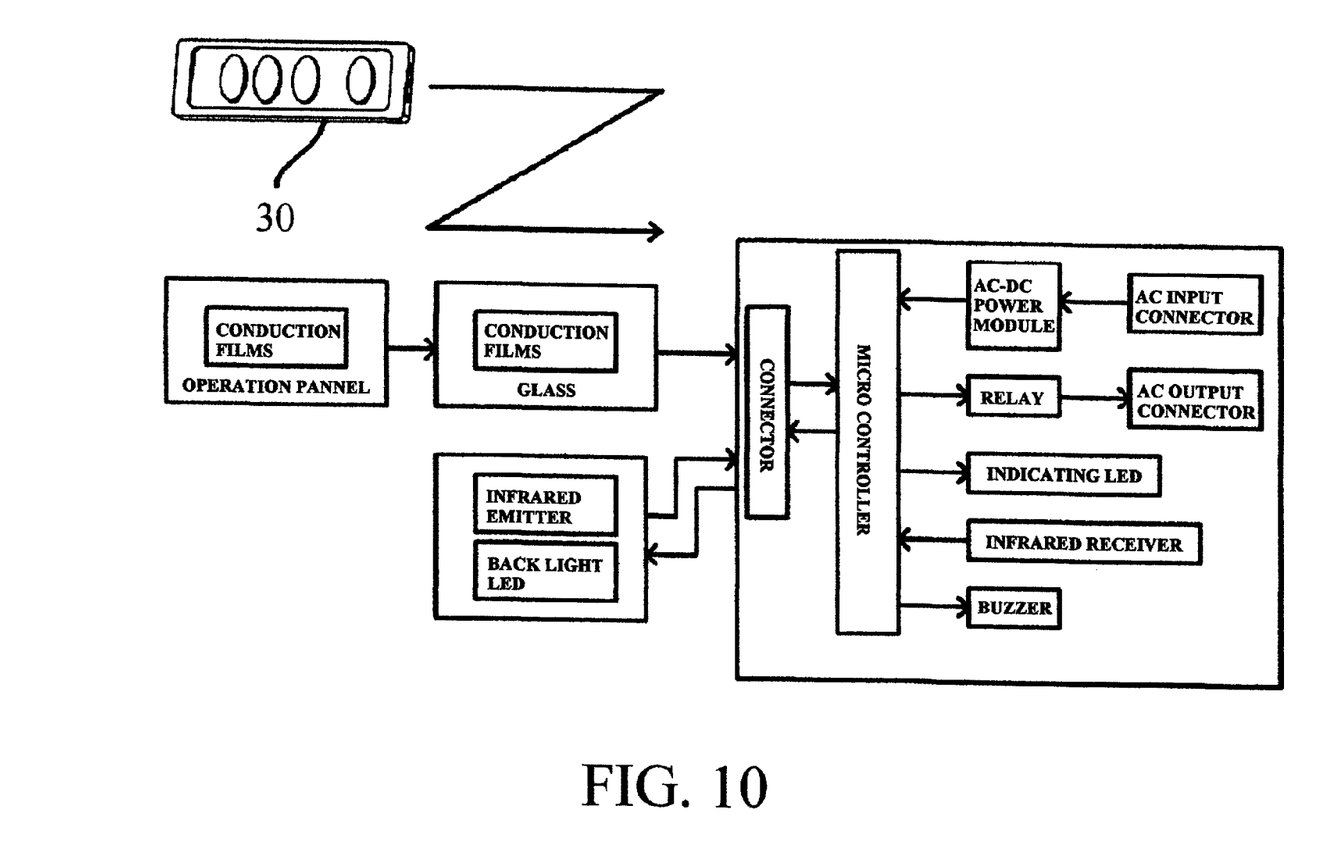
FIG. 10 is a block diagram showing the intelligent wall switch being in cooperation with the infrared remote controller in accordance with the present invention.

Further referring to FIGS. 2, 6, 9, and 10, during replacing an infrared remote controller 30, the user presses the extended operation panel 11 for a few seconds so that the micro controller 192 judges the wall switch is in an infrared memory mode and controls the indicating LEDs 199 to blink by pressing the key of the remote controller 30, an infrared code is received by the infrared receiver 197, calculated by the micro controller 192, and memorized the infrared code in a database, such that the indicating LEDs 199 recover to its original state and the buzzer 198 makes sound two times. Thereafter, as the user operates the infrared remote controller 30, an emitted infrared code is checked with the infrared codes memorized in the database by the micro controller 192. While user pressed the key of the remote controller 30, and the infrared code is matched, thereby driving the relay 193. The driven relay 193 provides or shuts off the AC power source to the AC output connector 194 and controls the indicating LEDs to emit the brightest light, such that the buzzer 198 makes sounds at a fixed frequency within a certain period of time.

While we have shown and described various embodiments in accordance with the present invention, it should be clear to those skilled in the art that further embodiments may be made without departing from the scope of the present invention.

What is claimed is:

1. An intelligent wall switch comprising:
   an extended operation panel including at least one sensor area, the sensor area including a first conducting film disposed on a back side thereof;
   a glass disposed on the back side of the sensor area of the extend operation panel and including at least one second conducting film plated onto the back side thereof;
   a first circuit board including a backlight LED and an infrared emitter and being connected to a flexible cable, and the flexible cable being connected to the second conducting film of the glass;
   a plastic frame disposed on the back side of the glass;
   a controller system including a second circuit board having an AC-DC power module, a plurality of relays and AC output connectors, and an AC input connector which are all mounted on a back side of the second circuit board, the second circuit board further has a micro controller, a flat cable connector, an infrared receiver, a buzzer, and a number of indicating LEDs which are all fixed on the front side thereof;
   a connecting piece and a housing being used to receive the AC-DC power module, the connecting piece being disposed on a back side of the frame, and the AC-DC power module being connected to the flexible cable by using the flat cable connector.

2. The intelligent wall switch as claimed in claim 1, wherein the extend operation panel is made of transparent plastic materials.

3. The intelligent wall switch as claimed in claim 1, wherein the first and second conducting films are made of transparent indium oxide materials.

4. The intelligent wall switch as claimed in claim 1 further comprising a name plate mounted on the back side of the glass.

5. The intelligent wall switch as claimed in claim 1, wherein the controller system further includes a buzzer fixed on the front side of the second circuit board.

6. The intelligent wall switch as claimed in claim 1, wherein the controller system further includes an engaging member fixed on the front side of the second circuit board.

7. The intelligent wall switch as claimed in claim 1, wherein a light guiding member is arranged at a predetermined position on a front side of the connecting piece in response to the indicating LEDs.

8. The intelligent wall switch as claimed in claim 1, wherein the frame includes a number of bolts secured thereon.

9. The intelligent wall switch as claimed in claim 1, wherein the micro controller memorizes various types of infrared codes to cooperate with a variety of infrared remote controllers.

10. The intelligent wall switch as claimed in claim 1, wherein the infrared emitter controls the backlight LED to power on/off as detecting object is close to or leaves away.

* * * * *